Dec. 15, 1970  T. WILLIAMS ET AL  3,547,683
VACUUM DEPOSITION AND RADIATION POLYMERISATION OF
POLYMER COATINGS ON SUBSTRATES
Filed June 19, 1967
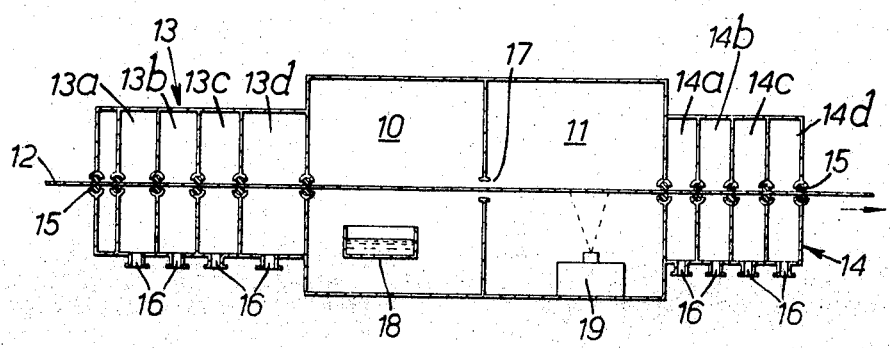
INVENTORS
TERENCE WILLIAMS
MICHAEL WILLIAM HAYES
BY
*Bacon & Thomas*
ATTORNEYS United States Patent Office 3,547,683
Patented Dec. 15, 1970

3,547,683
VACUUM DEPOSITION AND RADIATION POLYMERISATION OF POLYMER COATINGS ON SUBSTRATES
Terence Williams and Michael W. Hayes, Swansea, Wales, assignors to The British Iron and Steel Research Association
Filed June 19, 1967, Ser. No. 646,850
Int. Cl. C08f 1/24
U.S. Cl. 117—93.31                               9 Claims

ABSTRACT OF THE DISCLOSURE

The invention relates to a method of forming polymer coatings on substrates by first vapour depositing a thin, uniform film of a radiation-curable material on a substrate, which is usually a metal, and then irradiating the deposited film with a beam of accelerated electrons, whose energy is generally up to about 20 kev. The deposition is performed under conditions of reduced pressure and elevated temperature and the irradiation under reduced pressure.

---

This invention relates to the formation of coatings on substrates, more particularly, metal substrates such as tinplate, blackplate and Hi-top.

The formation of polymer coatings on metal substrates by the radiation-induced polymerisation of monomers is known; for example, the polymerisation of monomers by the action of a glow discharge has been described by Linder and Davies in J. Phys. Chem. 35, 3648 (1931), Goodman in J. Polymer Sci. 44, 551 (1960), Brick and Knox in Modern Packaging, 123 (1965) and more recently by Williams and Hayes in Nature, 209, 769 (1966). This process, however, has many disadvantages and these are described in detail in the article in Nature.

In glow discharge polymerisation, polymerisation of the monomer takes place on the surface of the electrodes by interaction of adsorbed molecules with activated polymer film and the growing film is continually activated by bombardment of the film with positive ions formed in the discharge. However, unlike radiation polymerisation, an undesirable side reaction takes place during glow discharge polymerisation which leads to contamination of the growing film; it is thought that electron bombardment of the monomer molecules in the discharge produces a wide variety of species (ranging from $C^+$ to activated polymer) and these species find their way to the polymerisation sites (on the activated polymer film) and either copolymerise with or become otherwise incorporated in the growing polymer film. This film may, in many cases, be coloured, degraded and loosely adherent to the electrode and films of consistent quality cannot be obtained from one process to the next.

A method of curing paint films using a beam of high energy electrons has been described in Electronics, March 1966, 35. In this process a film of a specially formulated paint is applied to the article to be coated and irradiation with the electron beam is then carried out under atmospheric pressure. The thickness of the film, usually at least 25 microns, and operation of the process under atmospheric pressure necessitate the use of electron beams having energies of about 200 kev. and above. The cost of such high energy electron sources is considerable and the running costs are also high, so that radiation doses above about 10 megarads are uneconomic. The materials used must also be relatively sensitive to radiation, and this means that many otherwise desirable coating materials cannot be used.

The formation of thin polymer coatings on metal substrates by the roller coating process is also known. This again has many disadvantages; for example, large quantities of solvents are used and long stoving times—and hence along drying ovens—are necessary, especially for continuously coating tinplate.

We have now developed an improved radiation-induced polymerisation process which gives good quality polymer coatings at a reasonable cost. This process comprises vapour depositing a radiation-curable material on the surface of a substrate and subjecting the deposited film to ionising radiation, preferably an accelerated electron beam, under vacuum to polymerise the material in the film.

The substrate will normally be a metal substrate and, in particular, a metal substrate which requires to be protected against corrosion by the application of the polymer coating. Typical substrates include steel strip, tinplate, blackplate, Hi-top and copper. However, other, non-metallic, electrically non-conductive substrates may also be coated in this way.

The radiation-curable materials which are used in this process can be any materials that can be cross-linked or polymerised under the action of ionising radiation (and this qualification means that many materials which cannot be polymerised or cross-linked by chemical means can be used) and which has a vapour pressure, at standard temperature and pressure, of less than 1 torr and preferably less than $10^{-3}$ torr. Suitable materials may be naturally-occurring or synthetic and, in general, can be divided into the following categories:

(1) Low molecular weight addition type polymers, natural oils and silicones

Addition type polymers with molecular weights below about 20,000 can be evaporated quite readily without extensive molecular breakdown or degradation taking place. Similarly, natural oils and silicone oils can be evaporated without effecting any major chemical change. Most of these polymers when bombarded with electrons in vacuum undergo a chemical reaction to give high molecular weight solids suitable as coating materials. Examples of this class of materials are low molecular weight polyethylene e.g. polyethylene grease, polypropylene, polystyrene, polyvinyl chloride, polybutadiene, polyisobutylene, polyvinylacetate, polyvinyl alcohol, polyacrylonitrile, polyvinyl ethers, polyvinyl ketones, polyacrylamide, polyacrylic acid and esters, rubber, chloroprene (neoprene), natural oils such as Congo oil, linseed oil, paraffin oil or paraffin wax, silicones, trioxan, paraldehyde and metaldehyde.

(2) Condensation polymers

Most synthetic condensation polymers, before curing, have relatively low molecular weight and may be evaporated without decomposition. The most important polymers in this category are epoxy, phenolic, amino, alkyd and polyurethane polymers, polyamides such as nylon and polycaprolactam and various combinations of these polymers.

(3) Monomers

Monomers, which have a sufficiently low vapour pressure can also be used. Examples of such monomers are butyl phthalate, acrylamide, N,N'-methylene-bisacrylamide, methylacrylamide, lauryl methacrylate, ceto-stearyl methacrylate, nonyl methacrylate, calcium acrylate, barium acrylate, potassium acrylate, vinyl stearate, vinyl carbazol, maleic anhydride and β-propiolactone.

(4) Miscellaneous

Apart from the materials already mentioned almost all organic compounds which are not fully saturated because of the presence in their structures of double or triple bonds or cyclic units, can also be used to give satisfactory coatings. Examples of such materials are decene, tetrahydrophthalic anhydride, dodecenyl succinic anhydride and the like.

Two or more materials (from one or more of the categories above) can be deposited on the substrate simultaneously to form a copolymer coating.

Deposition of the coating material is effected under conditions of temperature and pressure such that the material is vaporised with degradation (e.g. by oxidation) or molecular breakdown. In view of the low vapour pressure, at standard temperature and pressure, of the materials used, this necessitates the use of reduced pressures and elevated temperatures. The pressure in the deposition zone is suitably 10 torr or less, preferably below $10^{-1}$ torr and advantageously from $10^{-3}$ to $10^{-5}$ torr. The operating pressure actually selected will, of course, depend upon the coating material being used and will be above the vapour pressure of the material at standard temperature. Vaporisation of the coating material is assisted by the application of heat to the material which, for this purpose, is suitably contained in a heat-resistant container which can be heated electrically, for example, by resistance or induction heating. When the substrate is introduced into a deposition zone operated under such conditions, the coating material is rapidly deposited on the substrate by condensation, as a thin film (up to about 25 microns thick) in a manner similar to the vapour deposition of metallic films. The temperature of the substrate should be kept low when using coating materials with high vapour pressures, in order to prevent re-evaporation of the material before the irradiation can be carried out.

Irradiation of the deposited film on the substrate is effected under vacuum and suitable pressures in the irradiation zone will be generally the same as those used in the deposition zone, that is, generally below 10 torr and preferably below $10^{-1}$ torr and advantageously from $10^{-3}$ to $10^{-5}$ torr. However, it is possible to deposit the material at a relatively high pressure (e.g. about $10^{-1}$ torr) and then irradiate at a lower pressure (e.g. $10^{-4}$ to $10^{-5}$ torr). The purpose of the irradiation step is to convert the coating material to a high molecular weight polymer and so to form an adherent, coherent coating on the substrate. This process may take place by polymerisation of molecules of the coating material or by cross-linking of molecules in the coating material, depending upon the nature of the starting material. Electron accelerators are used to supply the beam of accelerated electrons. Accelerators can be obtained which give electron beams of varying energies and for the present purpose it has been found that those giving electron energies of up to about 20 kev. are suitable; this does not, however, preclude the use of higher electron energies. The irradiation of the deposited monomer film should be such as to polymerise or cross-link the material throughout its thickness, that is, the radiation source should be of sufficient energy to polymerise or cross-link the material immediately adjacent the substrate surface as well as the upper layers of molecules. The thickness of the film and the radiation source should, therefore, be correlated. If the radiation source is not capable of polymerising or cross-linking a film of the desired final total thickness throughout its depth, a film which can be polymerised throughout its depth should be deposited and the steps of material deposition and radiation polymerisation should be repeated until the desired final coating thickness is obtained.

The irradiation may take place in the presence or absence of the vapour of the radiation-curable material, but since only a low concentration of the vapour will be present in any case, there will be little danger of producing activated species which would tend to cause degradation of the polymer film. The high concentration of the radiation-sensitive material at the surface of the substrate ensures the production of a coating of adequate thickness. Since the electron bombardment takes place under vacuum only low electron energies are required and these can be produced with a relatively simple and inexpensive electron gun. Consequently, radiation doses up to about 1000 megarads can be used economically.

The amount of energy needed to effect the degree of polymerisation necessary to produce a satisfactory coating depends chiefly upon the coating material selected. The efficiency of the polymerisation or cross-linking is indicated by the G value of the starting material, G being a measure of radiation-chemical yields and being equal to the number of molecules changed per 100 ev. of energy absorbed—see An Introduction to Radiation Chemistry, Spinks and Wood, page 435. G values range from about 1 for cross-linking of polyethylene to about 10,000 for the polymerisation of monomers such as acrylates.

As mentioned above, radiation doses of up to about 1000 megarads can readily be used with the process of the present invention (compared with doses of about 50 megarads for the conventional processes) and this means that the coating material can be selected from a much wider range of possible materials; for example, materials with G values of 1 and less can be treated economically.

The process can be operated continuously on continuous elongated material in the form of strip or wire and indeed, is particularly suited for such applications. The continuous substrate is passed through the deposition zone where the coating material is deposited on it and then into the irradiation zone where the deposited material is polymerized or cross-linked. The pressures in the two zones can be the same or different; for example, evaporation and deposition can take place at about $10^{-1}$ torr while irradiation can be carried out at $10^{-4}$ to $10^{-5}$ torr—in such instances the two zones have to be separated by a vacuum seal. Seals have also to be provided at the entrance to and exit from each of the zones in order to maintain the desired conditions in each zone. The substrate can be moved through a number of deposition and irradiation zones in sequence alternately one after the other, in order to build up the desired thickness of coating. The material deposited and polymerized at each of these deposition and irradiation zones may be the same or, if desired, it may be different at some or each of the zones in order to build up a stratified coating.

The procedure described above, in which the deposition is carried out at one pressure and the irradiation at another is particularly advantageous in that it permits each stage of the process to be carried out under the most favourable conditions. A preferred form of apparatus for effecting sequential deposition and irradiation is illustrated diagrammatically in the single figure of the accompanying drawing, which is given by way of example only.

Referrng to the drawing, the apparatus comprises a deposition chamber 10 and an irradiation chamber 11. A steel strip substrate 12 enters the apparatus from the left-hand side through an inlet sealing box 13 and passes out from the apparatus at the right-hand side through an outlet sealing box 14, as indicated by the arrow. The inlet sealing box 13 comprises a plurality of sealing chambers 13a, 13b, 13c and 13d, and the outlet sealing box 14 is constructed similarly, with sealing chambers 14a, 14b, 14c and 14d. Each sealing chamber is sealed against the strip 12 by means of a seal 15 and is also connected to a vacuum pump by means of connections 16.

The strip passes from the deposition chamber 10 into the irradiation chamber 11 through a narrow slot 17 in the dividing wall between the two chambers. The different vacua in the two chambers are maintained by pumping from the inlet sealing box 13 and the outlet sealing box 14 at different rates. The narrowness of the slot 17 between the two chambers enables the different vacua to be maintained without the necessity for using seals which engage in physical contact with the strip and which would tend to remove the thin layer of deposited material.

In the deposition chamber 10 the substrate has a thin film of the radiation-sensitive material deposited on it from the vapour phase, the vapour being supplied from an electrically-heated container 18 of the material. The substrate then passes through the slot 17 into the irradiation chamber 11 where the deposited coating is irradiated with a beam of accelerated electrons from an electron gun 19. The coating is rapidly polymerized or cross-linked by the electrons and can then be safely handled and contacted by the seals 15 of the outlet sealing box 14 as the coated substrate passes out of the apparatus. If desired, two electron guns can be provided in the irradiation chamber 11 so as to irradiate both sides of the substrate simultaneously.

In order that the invention may be more fully understood, the following examples are given by way of illustration only.

EXAMPLE 1

Uncured epoxy resins (molecular weight 500–1000) were evaporated at a pressure of $10^{-4}$ to $10^{-5}$ torr onto tinplate and blackplate to give a deposit up to 5 microns thick. The deposited coatings were then bombarded with electrons having energies of from 15 kev. to 20 kev. The coatings so produced were clear, adherent, flexible and corrosion resistant.

In a similar manner, uncured polyesters (molecular weight about 1000), liquid paraffin, linseed oil, low molecular weight polyethylene (molecular weight about 1,000 to 10,000), vinyl stearate and acrylamide were evaporated onto metal substrates to give good quality coatings.

EXAMPLE 2

Uncured epoxy resins were evaporated onto tinplate and blackplate at pressures of from 0.1 to 1.0 torr and subsequently bombarded at pressures of $10^{-4}$ to $10^{-5}$ torr with electrons of 15–20 kev. energy to give coatings with properties similar to those described in Example 1.

EXAMPLE 3

Uncured polyester resin was co-evaporated with vinyl stearate at $10^{-1}$ torr and bombarded at $10^{-4}$ to $10^{-5}$ torr with electrons of 15–20 kev. energy to give a flexible, adherent copolymer coating.

In all the preceding examples it was found that the deposition and curing process take place very fast—the deposition rates varied from one micron/second to one micron/minute. The radiation-induced curing was completed in times varying from one second to one minute.

We claim:

1. A continuous process for coating a substrate or substrates, which comprises passing a continuous, elongated substrate or a plurality of discontinuous substrates arranged in sequence continuously through a first zone and then through a second zone, vapour depositing in the first zone, under vacuum, on the surface of the substrate or substrates a coating material which can be cross-linked or polymerised under the action of an accelerated electron beam, X-rays or γ-rays and which has a vapour pressure, at standard temperature and pressure, of less than 1 torr, and in the second zone, subjecting the coating material deposited in the first zone to irradiation by an accelerated electron beam, X-rays or γ-rays, under vacuum to cross-link or polymerise the coating material, said first and second zones being separated by a physical barrier so that the second of said zones is substantially devoid of gaseous coating material.

2. A process according to claim 1, in which irradiation is effected with an electron beam having an electron energy of up to about 20 kev.

3. A process according to claim 1, in which irradiation is effected at a pressure of up to $10^{-1}$ torr.

4. A process according to claim 1, in which the coating material is deposited on the substrate or substrates at a pressure of up to 10 torr.

5. A process according to claim 1, in which the coating material is deposited on the substrate or substrates at a pressure of up to $10^{-3}$ torr.

6. A process according to claim 1, in which the coating material is deposited on the substrate or substrates at a pressure of up to $10^{-1}$ torr and the deposited material is subjected to said irradiation at a lower pressure of from $10^{-3}$ to $10^{-5}$ torr.

7. A process according to claim 1, in which the substrate or substrates is/are formed of a metal.

8. A process according to claim 1, in which the coating material comprises a material selected from the group consisting of epoxy resins and uncured polyester resins.

9. A continuous process for coating a substrate or substrates, which comprises passing a continuous elongated substrate or a plurality of discontinuous substrates arranged in sequence continuously through a first zone and then through a second zone, depositing in the first zone under vacuum on the surface of the substrate or substrates a coating of a coating material consisting essentially of a low molecular weight polymeric material which can be cross-linked under the action of an accelerated electron beam, X-rays or γ-rays, and in the second zone subjecting the coating material deposited in the first zone to irradiation, under vacuum, by an accelerated electron beam, X-rays or γ-rays to cross-link the coating material, said first and second zones being separated by a physical barrier so that the second of said zones is substantially free of gaseous coating materials.

References Cited

UNITED STATES PATENTS

| 3,392,051 | 7/1968 | Caswell et al. | 117—93.41X |
| 3,397,672 | 8/1968 | Dykeman et al. | 118—49.5X |

FOREIGN PATENTS

| 801,479 | 9/1958 | Great Britain | 117—93.31 |

ALFRED L. LEAVITT, Primary Examiner

J. H. NEWSOME, Assistant Examiner

U.S. Cl. X.R.

117—106